United States Patent [19]

Whelan

[11] 4,105,564

[45] Aug. 8, 1978

[54] PAINT STRAINER

[75] Inventor: James P. Whelan, Plymouth, Mass.

[73] Assignee: Ad-Tec Products, Inc., Plymouth, Mass.

[21] Appl. No.: 686,302

[22] Filed: May 14, 1976

[51] Int. Cl.² .............................................. B01D 29/10

[52] U.S. Cl. ................................. 210/497 R; 93/1 R; 210/497 FB; 210/499; 210/507

[58] Field of Search ............................ D7/47; D23/4; 210/497 R, 497 FB, 497.1, 493 R, 499, 507; 426/81; 206/505, 515, 499, 519, 520; 229/1.5 B, 4.5, 53, 57; 93/36.1, 36.2, 1 D, 86, 1 R

[56] References Cited

U.S. PATENT DOCUMENTS

| | | | |
|---|---|---|---|
| D. 170,676 | 10/1953 | Bourne-Vanneck | D7/47 |
| D. 235,542 | 6/1975 | Blocker | D23/4 |
| 1,002,346 | 9/1911 | Weeks | 229/53 |
| 1,519,890 | 12/1924 | Von Gunten | 210/497 X |
| 2,220,312 | 11/1940 | Barbieri | 93/36.1 X |
| 3,527,380 | 9/1970 | Brown | 206/519 |
| 3,670,922 | 6/1972 | Phillips | 206/519 |
| 3,738,889 | 6/1973 | Whelan | 210/497 X |

*Primary Examiner*—Frank Sever

*Attorney, Agent, or Firm*—Dike, Bronstein, Roberts, Cushman & Pfund

[57] ABSTRACT

A paint strainer comprising a conical receptacle having a truncated lower end within which there is an upwardly concave bottom wall, the convex interior side of which constitutes the bottom of the receptacle and openings in the conical wall covered with a fine mesh gauze. The openings extend down to the base of the interior convex bottom wall.

1 Claim, 7 Drawing Figures

PAINT STRAINER

BACKGROUND OF THE INVENTION

In my U.S. Pat. Nos. 3,567,033 and 3,738,889, there is shown a conical paint strainer having gauze-covered openings. As therein shown, the openings are spaced from the apex at the lower end of the cone so that the conical lower end of the cone is imperforate and as a result after paint had been strained through the gauze-covered openings, a residual puddle of paint is left at the bottom. While this small amount of paint seems insignificant, when multiplied by the many hundreds of straining operations, it represents a substantial loss of paint, and so it is desirable to be able to recover this residual puddle at the base of the cone. Furthermore, some paints contain heavy pigments which descend to the bottom of the strainer forming an accumulation which tends to discolor the paint being strained, and so it is desirable to prevent any such accumulation. It is the purpose of this invention to so modify the construction of the paint strainer disclosed in the aforesaid patents so as to enable draining the paint completely from the strainer and to prevent any accumulation of pigments at the bottom which might result in discoloring. This is accomplished herein without weakening the lower end of the strainer and without requiring any major modifications in the method of manufacture as disclosed in the aforesaid U.S. Pat. No. 3,738,889.

SUMMARY

As herein illustrated, the invention resides in a conical paint strainer comprising a receptacle having a conical side wall, the lower end of which is truncated, within which there is an upwardly concave bottom wall, the upwardly convex interior surface of which constitutes the bottom of the receptacle and openings in the conical side wall, some of which at least extend down to the base of the interior convex bottom wall. The upwardly concave bottom wall is constituted by discplacing the apex of the cone upwardly into the receptacle to a level such that the base of the upwardly convex bottom wall coincides substantially with the lowermost openings in the conical side wall. The openings are preferably constituted by a fine screen mesh covering openings in the conical side wall.

DESCRIPTION OF THE INVENTION

The invention will now be described in greater detail with reference to the accompanying drawings wherein.

Figure 7:
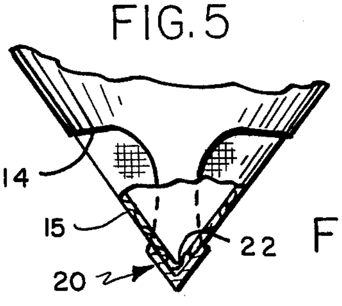
FIG. 7 shows the lower apex end of the cone prior to modification according to this invention.

Referring to the drawings, the strainer is made by cutting from a continuous sheet of suitable flexible material such as cardboard as shown in my U.S. Pat. No. 3,567,033 arcuate blanks 12 provided with openings 14—14 which are then covered with a filtering material such as a gauze mesh 15 adhesively secured to the marginal edges of the openings. The blank is provided with ears 16—16 and with relatively wide overlapping side seams 18—18 receiving adhesive so that when the blank is formed into a cone and secured by overlapping the adhesive receiving portions, a conical receptacle is provided which has at its apex a sharp point 20 FIG. 7 at opposite sides of which there are symetrically arranged the gauze-covered openings 14—14. The imperforate conical portion of the conical side wall below the openings provides a rigid support for the gauze which covers the openings which otherwise would be deformed by the weight of the paint.

As thus constructed, there is at the lower end of the receptacle below the openings an interior imperforate pocket 22 which retains a residual amount of paint and although the quantity of paint retained by a single receptacle is small; when this small amount is multiplied by hundreds and thousands of filtering operations, the total amounts to a considerable loss and so it is highly desirable to recover this residual paint. This is accomplished according to this invention by displacing the apex 20 of the cone upwardly into the cone so as to provide an upwardly concave bottom wall 24, the inner convex side of which constitutes the bottom wall of the receptacle. The bottom wall 24 is displaced upwardly, sufficiently so that the lower extremities of the openings 14—14 coincide with the base 26 of the upwardly convex side of the bottom wall. By so forming the bottom wall, paint that is at the bottom of the receptacle will flow outwardly through the openings 14—14 without constraint.

Figure 1:
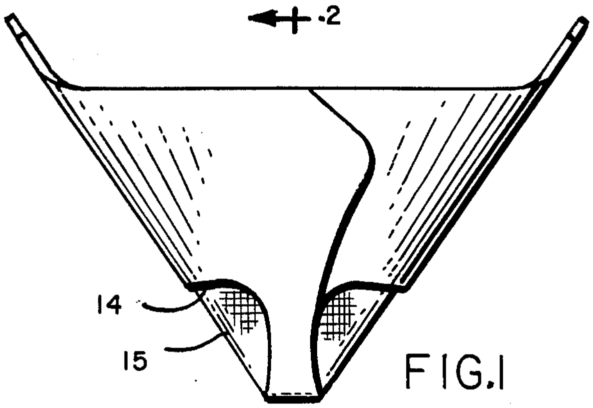
FIG. 1 is an elevation of the conical paint strainer of the invention.
Figure 2:
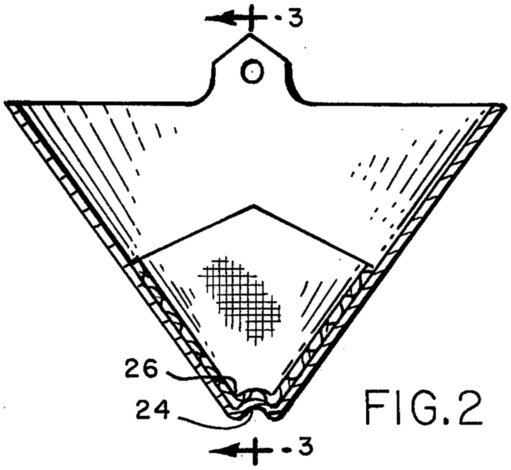
FIG. 2 is a diametral section taken transversely of the paint strainer through the supporting ears.
Figure 3:
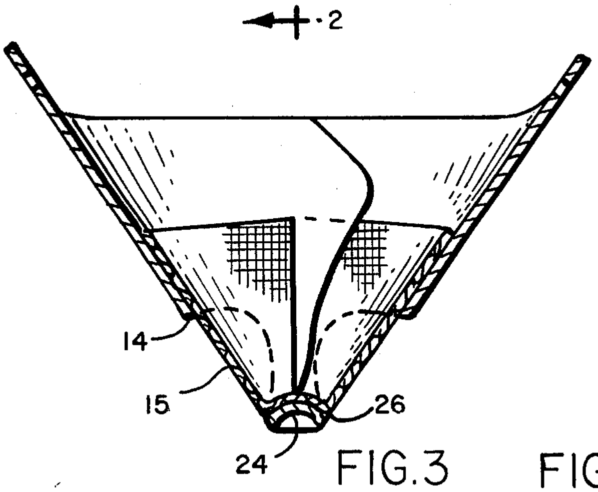
FIG. 3 is a section taken transversely of the paint strainer at right angles to that shown in FIG. 2.

The provision of the upwardly convex bottom wall 24 also prevents an accumulation of any solid matter in the paint at the bottom which is undesirable because such an accumulation modifies the color of the paint above it which may very well require that the entire surface being painted be redone. As will be seen by reference to FIGS. 3 and 4, the convex surface of the bottom wall promotes lateral flow of the paint at the bottom through the openings 13-14 distinguished from a bottom which is merely flat.

Figure 4:
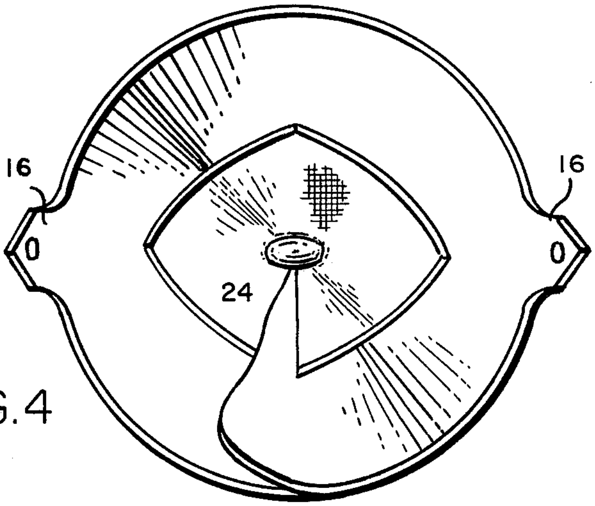
FIG. 4 is a planned view looking down into the top of the paint strainer.
Figure 5:
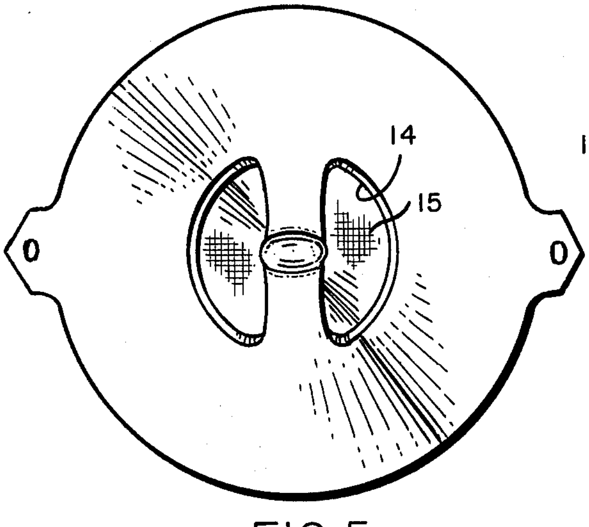
FIG. 5 is a view looking upwardly at the bottom of the paint strainer.
Figure 6:
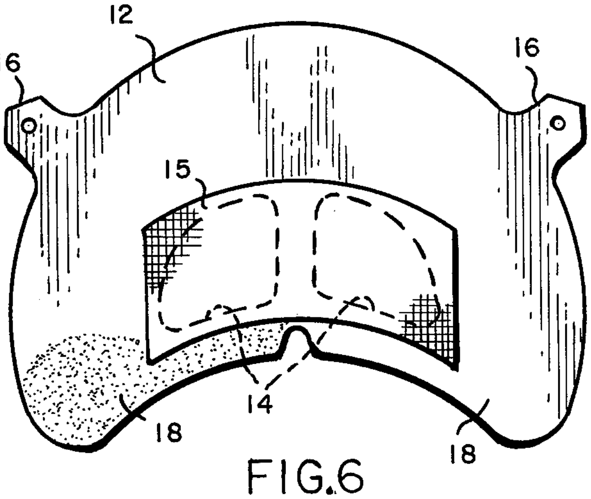
FIG. 6 is a plan view of the blank prepared with openings covered with gauze mesh prior to forming it into a cone.

The upwardly convex bottom wall 24 as most plainly shown in FIGS. 4 and 5 is generally elliptical which provides the advantage that when the strainers are stacked, they will be automatically oriented to positions in which the ears 16—16 are aligned.

The structure thus described provides other advantages. One such advantage is to eliminate any hole at the apex of the cone which may be inadvertently formed in the manufacture of the cone by improper overlapping of the ends of the blank, thus making it possible to save many cones which would otherwise have to be discarded.

The upward displacement of the conical end of the cone also provides a truncated structure which shortens the top to bottom dimensions of a stack of cones so that a given number of cones can be stacked within a shipping carton which is considerably shorter in top to bottom dimensions than would be required for a corresponding number of cones not so truncated. There is still another advantage derived from the provision of the truncated lower end in that during shipping there is less likelihood of the carton being punctured by the impact of the truncated ends of the cones with the ends of the carton.

In forming a plain cone, it is necessary to apply liquid adhesive to the blank in sufficient amount to seal the overlap all the way to the point so that the point will not open in usage. Very often, in spite of precaution, the adhesive will extend to the outer surface and since the strainers are stacked immediately after being formed, the excessive adhesive which is still tacky at this stage may cause the strainers to stick together with the result that many are damaged when removed. By inverting the point as herein disclosed, less adhesive is required to prevent opening of the point and a substantial border can be established between the overlapping edges of the blank, thereby eliminating the possibility of adhesive extending onto the outer surface and, hence, of the strainers when stacked.

The doubling of the material at the lower end of the cone by the inversion as herein illustrated substantially strengthens the lower end and locks a portion of the mesh that was heretofore held in place only by the adhesive. A drop test on groups of 50 strainers having pointed ends show some delamination at the point where the same test on the inverted structure as herein disclosed produced no damage.

As was pointed out above, the shape of the inverted lower end is somewhat elliptical rather than perfectly round and this has the important advantage of keeping the strainer tabs in alignment. This is further advantageous both from the standpoint of packaging and appearance.

From the foregoing, it is evident that the truncated strainer made according to this invention provides a number of distinct advantages over the conventional conical strainer, to wit, the economy in use in the recovery of paint, insurance of uniformity of color, the recovery of what would otherwise be defective strainers during manufacture, elimination of sticking when stacking, automatic alignment of the ears when stacked, economy in the size of shipping container cartons and elimination of loss through destruction in shipping.

I claim:

1. A wide-mouthed, conical paint strainer comprised of stiff paperboard constituting a shape-retaining supporting structure for holding a quantity of paint, said structure having an upper open mouth, a downwardly tapering conical side wall and a truncated lower end containing an upwardly concave imperforate bottom which forms interiorly of the structure at the bottom an imperforate elevation bounded by an annular gutter, said side wall containing in its lower half, openings, the lower edges of which coincide with the bottom of the gutter below the apex of the elevation and a cloth covering mesh secured to the side wall at the inner side over said opening and the interior imperforate elevation, said mesh constituting the outer side and bottom of the gutter and said imperforate elevation constituting the inner side of the gutter.

* * * * *